United States Patent
Nölle

(10) Patent No.: US 7,086,816 B2
(45) Date of Patent: Aug. 8, 2006

(54) SUPPORT SYSTEM FOR FRAME OF VEHICULAR CARGO NET

(75) Inventor: Hans-Erich Nölle, Schwelm (DE)

(73) Assignee: Nolle-Pepin GmbH & Betriebs KG, Schwelm (DE)

( * ) Notice: Subject to any disclaimer, the term of this patent is extended or adjusted under 35 U.S.C. 154(b) by 0 days.

(21) Appl. No.: 10/515,894

(22) PCT Filed: Apr. 9, 2003

(86) PCT No.: PCT/EP03/03648

§ 371 (c)(1),
(2), (4) Date: Nov. 23, 2004

(87) PCT Pub. No.: WO03/099615

PCT Pub. Date: Dec. 4, 2003

(65) Prior Publication Data

US 2005/0220566 A1 Oct. 6, 2005

(30) Foreign Application Priority Data

May 27, 2002 (DE) .......................... 202 08 280 U

(51) Int. Cl.
*B61D 45/00* (2006.01)
(52) U.S. Cl. ...................... 410/118; 410/101; 224/557; 224/563; 249/503
(58) Field of Classification Search ................ 411/508, 411/913; 403/329; 296/37.16, 97.9, 97.12, 296/97.13; 248/71, 503, 505; 410/101, 410/106, 118; 224/543, 549, 557, 563
See application file for complete search history.

(56) References Cited

U.S. PATENT DOCUMENTS

| 2,087,358 | A | * | 7/1937 | Place ........................... 248/73 |
| 2,100,017 | A | * | 11/1937 | Van Uum ..................... 24/294 |
| 3,231,300 | A | * | 1/1966 | Moroney ..................... 403/163 |
| 5,547,187 | A | * | 8/1996 | Spykerman ............... 296/37.16 |
| 5,685,470 | A | * | 11/1997 | Moore ......................... 224/567 |
| 5,765,787 | A | * | 6/1998 | de Beers et al. ............. 248/73 |
| 5,924,611 | A | * | 7/1999 | Mizuno ..................... 224/42.4 |
| 6,120,077 | A | * | 9/2000 | Westphal et al. ......... 296/97.13 |

* cited by examiner

*Primary Examiner*—Flemming Saether
(74) *Attorney, Agent, or Firm*—Andrew Wilford

(57) ABSTRACT

A cargo-net frame is supported on a cover of a motor vehicle trunk by two different supports each having a body fitted through the covering and having an outer portion formed with an annular outwardly projecting shoulder bearing inward against an outer face of the covering and an inner portion formed as a clip spaced from the shoulder by a distance equal generally to the covering thickness and bearing outward on an inner face of the covering. One of the bodies is tubular and receives an end of the net-frame element. The other body is formed with a laterally open eye in which the element is elastically retained.

5 Claims, 1 Drawing Sheet

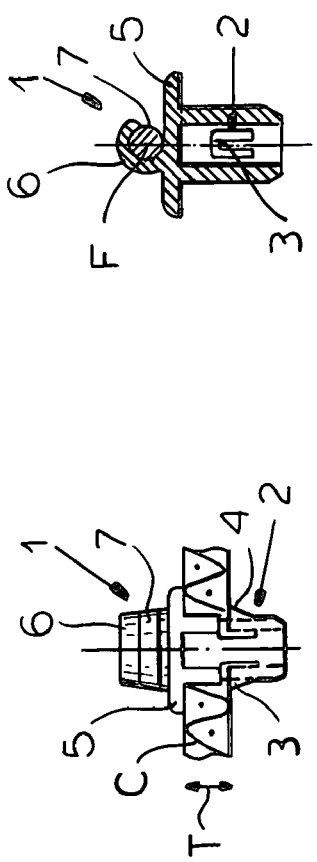

SUPPORT SYSTEM FOR FRAME OF VEHICULAR CARGO NET

CROSS REFERENCE TO RELATED APPLICATIONS

This application is the US national phase of PCT application PCT/EP03/03648, filed 9 Apr. 2003, published 4 Dec. 2004 as WO 03/099615, and claiming the priority of German patent application 20208280.6 itself filed 27 May 2002.

FIELD OF THE INVENTION

The invention relates to a holding element for mounting metal frame nets, especially lateral trunk nets, which comprises a snap-in device, an annular shoulder and a fixing element that can be engaged with the metal frame of the metal frame net for fixing it in place.

BACKGROUND OF THE INVENTION

The increased use of nets in motor vehicles and other comparable vehicles is associated with problems in that these nets, which are often metal frame nets, have to be affixed in a suitable manner to the sections of walls, seat backs etc., which sections have been provided for them.

OBJECT OF THE INVENTION

It is thus the object of the invention to create a holding element for affixing metal frame nets that makes it possible to economically and reliably affix a metal frame net, in particular a lateral trunk net, to a trunk floor covering or trunk wall covering.

SUMMARY OF THE INVENTION

According to the invention, this object is met in that the distance between the snap-in device and the annular shoulder corresponds approximately to the thickness of the trunk floor covering or trunk wall covering to which the holding element can be affixed by means of the snap-in device. This results in reliable fixing of the holding element to the trunk floor covering or trunk wall covering which leads to a correspondingly reliable fixing of the metal frame net at the desired location. The holding elements according to the invention can either be supplied as components of the metal frame net, or they can be preinstalled at the desired locations. In the latter case, for the purpose of installation, the metal frame net simply has to be made to engage the respective fixing element of the holding element. The holding elements can be affixed at any desired locations on the trunk floor covering or trunk wall covering.

Advantageously, the snap-in device is formed by at least two clip catches which are preferably diametrically opposed to each other, wherein the clip catches are sprung components on the holding element and in their released position jam the trunk floor covering or trunk wall covering between themselves and the annular shoulder. As is the case with the annular shoulder, the clip catches in their released state protrude beyond the external circumference of the section of the holding eye, from which section the clip catches are formed so that the trunk floor covering or trunk wall covering can be affixed or jammed between the distal ends of the clip catches, which distal ends are located opposite the annular shoulder, and the annular shoulder.

If the holding element is to serve as a lower holding element, it is advantageous if the fixing element of the holding element is a holding eye comprising a casing mouth into which a section of the metal frame of the metal frame net can be clipped in.

If the holding element is to serve as an upper holding element, the fixing element of the holding element advantageously is a plug-in receptacle into which a plug-in section of the metal frame of the metal frame net can be plugged in.

Especially plastic, preferably Ultramid B3S, has shown to be particularly advantageous as a material for the holding element.

BRIEF DESCRIPTION OF THE DRAWING

Below, embodiments of the invention are explained in more detail with reference to the drawings. The following are shown:

FIG. 1 a schematic diagram of a first embodiment of a holding element according to the invention;

FIG. 2 a section view, rotated by 90 degrees, of the embodiment shown in FIG. 2, of the holding element according to the invention;

FIG. 3 a schematic diagram of a second embodiment of the holding element according to the invention;

FIG. 4 a section view, rotated by 90 degrees, of the embodiment shown in FIG. 3, of the holding element according to the invention; and FIG. 5 is a small scale sectional view illustrating use of the two holding elements in accordance with the invention.

SPECIFIC DESCRIPTION

An embodiment shown in FIGS. 1 and 2 of a holding element 1 according to the invention is used to affix a metal frame net, in particular a lateral trunk net, to a trunk floor or wall covering C of predetermined thickness T. The holding element shown in FIGS. 1 and 2 comprises a snap-in device 2, which in the embodiment shown is formed by two clip catches 3 and 4. In the embodiment shown, the two clip catches 3 and 4 are made in one piece together with the holding element 1 and—due to the elasticity of the material from which the holding element 1 is made—can engage in spring action, around their proximal ends, in relation to the remaining holding element 1. The two clip catches 3 and 4 are arranged so as to be diametrically opposed at the circumference of the holding element 1. They taper from their proximal to their distal ends, with these ends protruding in their released state beyond the external circumference on the section of the holding element 1, which section forms the clip catches 3 and 4.

Furthermore, the holding element 1 comprises a radially protruding annular shoulder 5 that is opposite to the free distal ends of the clip catches 3 and 4 of the snap-in device 2.

The distance between the underside of the annular shoulder 5 that is located opposite the clip catches 3 and 4 on the one hand and the free distal ends of the clip catches 3 and 4 on the other hand, approximately corresponds to the thickness T of the trunk floor or wall covering C so that this covering C can be jammed between the clip catches 3 and 4 and the annular shoulder 5.

If the holding element 1 is forced through the trunk floor or wall covering C, due to the elasticity of the material from which the holding element 1 is made, the clip catches 3 and 4 spring radially inward, and then immediately spring back to their released position, shown in FIG. 1, as soon as the clip catches 3 and 4 have been completely pushed through the trunk floor or wall covering C. As soon as this has happened, the trunk floor or wall covering C is jammed between the distal ends of the clip catches-3 and 4 and the underside of the annular shoulder 5. The holding element 1 is now in its affixed position.

For the purpose of affixing a section of the metal frame F of the metal frame net, the holding element 1 shown in FIGS. 1 and 2 comprises a holding bush or eye 6 that forms a cylindrical receptacle for a section of the metal frame F. This cylindrical receptacle is accessible via a laterally open mouth slot 7 in the holding eye 6. The holding eye 6 is arranged on the face of the annular shoulder 5 that is directed from the clip catches 3 and 4. The casing mouth 7 is arranged directly above the annular shoulder 5. The width of the casing mouth 7 is somewhat narrower than the diameter of the metal frame F of the metal frame net so that the metal frame F is fixed within the holding eye-6 after it has been pushed into the cylindrical receptacle of the holding eye 6, taking advantage of the elastic characteristics of the material which forms the holding element 1.

The holding element 1' shown in FIGS. 3 and 4 differs from the holding element 1 shown in FIGS. 1 and 2 in that its fixing element is a tubular plug-in receptacle or socket 8 into which a plug-in section of the metal frame F of the metal frame net can be plugged. In the embodiment shown in FIGS. 3 and 4, the plug-in socket 8 extends longitudinally through the holding element 1'. In all other respects the structure of FIGS. 3 and 4 is the same as that in FIGS. 1 and 2, with functionally identical parts bearing the same references plus primes.

The holding element 1 shown in FIGS. 1 and 2 usually serves as shown in FIG. 5 as a lower holder, while the holding element 1' shown in FIGS. 3 and 4 usually serves as an upper holder for the corresponding sections of the metal frame F of the metal frame net.

The plastic material sold under the trade name Ultramid B3S has proven to be a particularly suitable material for the holding elements 1 and 1' in the embodiments according to FIGS. 1 and 2, and 3 and 4, respectively.

The invention claimed is:

1. In combination with a motor-vehicle covering of predetermined thickness and a net frame element, a holding system comprising:
    an upper holder having a tubular body fitted through the covering, in which is received an end of the net-frame element, and having an outer portion formed with an annular outwardly projecting shoulder bearing inward against an outer face of the covering and an inner portion formed as a clip spaced from the shoulder by a distance equal generally to the covering thickness and bearing outward on an inner face of the covering; and
    a lower holder spaced from the upper body and having a body that is fitted through the covering and that has an outer portion formed with an annular outwardly projecting shoulder bearing inward against the outer face of the covering and carrying a laterally open eye in which the net frame element is elastically retained and an inner portion formed as a clip spaced from the respective shoulder by a distance equal generally to the covering thickness and bearing outward on the inner face of the covering.

2. The holding system defined in claim 1 wherein each holder has two such clips diametrically opposite each other and elastically deformable for movement between inner and outer positions.

3. The holding system defined in claim 1 wherein the eye has a laterally open mouth through which the frame element can be forced with temporary elastic deformation of the eye.

4. The holding system defined in claim 1 wherein the holders are of an elastically deformable plastic.

5. The holding system defined in claim 1 wherein the holder with the tubular body is above the other holder.

* * * * *